United States Patent
Zeller (10) Patent No.: US 12,490,913 B2
(45) Date of Patent: Dec. 9, 2025

(54) SYSTEM AND COMPUTER-IMPLEMENTED METHOD FOR ASSIGNING AT LEAST ONE CONTRAST TO AT LEAST ONE MAGNETIC RESONANCE IMAGE DATASET

(71) Applicant: Siemens Healthineers AG, Forchheim (DE)

(72) Inventor: Mario Zeller, Erlangen (DE)

(73) Assignee: Siemens Healthineers AG, Forchheim (DE)

(*) Notice: Subject to any disclaimer, the term of this patent is extended or adjusted under 35 U.S.C. 154(b) by 540 days.

(21) Appl. No.: 17/946,339

(22) Filed: Sep. 16, 2022

(65) Prior Publication Data

US 2023/0077932 A1    Mar. 16, 2023

(30) Foreign Application Priority Data

Sep. 16, 2021    (DE) ............... 102021210281.6

(51) Int. Cl.
  *A61B 5/055*    (2006.01)
  *G06N 3/08*    (2023.01)
  *G06N 3/045*    (2023.01)

(52) U.S. Cl.
  CPC ............ *A61B 5/055* (2013.01); *G06N 3/08* (2013.01); *G06N 3/045* (2023.01)

(58) Field of Classification Search
  USPC ....... 128/897–899, 920, 922–925; 378/1–90; 382/103, 107, 128–131, 154–159, 382/162–165, 190–225; 704/1–275; 706/1–62, 900–903, 934
  See application file for complete search history.

(56) References Cited

U.S. PATENT DOCUMENTS

| | | | | |
|---|---|---|---|---|
| 10,444,316 | B2 * | 10/2019 | Greiser | G01R 33/4818 |
| 2014/0133725 | A1 * | 5/2014 | Feiweier | G01R 33/50 |
| | | | | 324/318 |
| 2017/0011185 | A1 * | 1/2017 | Schweizer | G16H 50/20 |
| 2018/0011160 | A1 * | 1/2018 | Greiser | G01R 33/4818 |
| 2019/0041478 | A1 * | 2/2019 | Grodzki | A61B 5/055 |
| 2022/0171008 | A1 | 6/2022 | Zeller | |

FOREIGN PATENT DOCUMENTS

| | | |
|---|---|---|
| DE | 102012220449 A1 | 5/2014 |
| DE | 102015212953 A1 | 1/2017 |
| DE | 102017213222 A1 | 2/2019 |
| DE | 102020215031 A1 | 6/2022 |

OTHER PUBLICATIONS

Kaiming He, Xiangyu Zhang, Shaoqing Ren, and Jian Sun, "Deep Residual Learning for Image Recognition" CoRR, abs/1512.03385, 2015.

* cited by examiner

*Primary Examiner* — Marcellus J Augustin
(74) *Attorney, Agent, or Firm* — Banner & Witcoff, Ltd.

(57) ABSTRACT

In a computer-implemented method for assigning at least one contrast to at least one magnetic resonance image dataset of a recording region of a patient, input data comprising magnetic resonance data of the magnetic resonance image dataset is received, at least one trained assigning function is applied to the input data, and the output data is provided. The output data includes a contrast assigning information item. The contrast exists due to the use of a contrast-specific magnetic resonance sequence during the recording.

19 Claims, 4 Drawing Sheets

SYSTEM AND COMPUTER-IMPLEMENTED METHOD FOR ASSIGNING AT LEAST ONE CONTRAST TO AT LEAST ONE MAGNETIC RESONANCE IMAGE DATASET

CROSS REFERENCE TO RELATED APPLICATIONS

This patent application claims priority to German Patent Application No. 102021210281.6, filed Sep. 16, 2021, which is incorporated herein by reference in its entirety.

BACKGROUND

Field

The disclosure relates to a computer-implemented method for assigning at least one contrast to at least one magnetic resonance image dataset of a recording region of a patient, wherein the contrast exists due to the use of a contrast-specific magnetic resonance sequence during the recording. In addition, the disclosure relates to an assigning facility, a computer program and an electronically readable data carrier.

Related Art

Magnetic resonance imaging is nowadays a well-established imaging modality, in particular, in medical diagnostics. Therein, spins aligned in a main magnet field are excited in a recording region of a patient by means of radiofrequency signals and the decay of the excitation is measured. For spatial encoding, gradient fields created by a gradient coil arrangement are typically used. The pattern of the radiofrequency pulses and gradient pulses is typically referred to as a magnetic resonance sequence.

Typically, different magnetic resonance sequences are used in order to be able to achieve particular image contrast levels (referred to below simply as "contrasts") within the recorded magnetic resonance image dataset. The image value in a magnetic resonance image is determined therein substantially by three parameters, specifically firstly the proton density, that is the number of excitable spins per unit volume, the T1 relaxation time and the T2 relaxation time, wherein in relation to the latter, the effective T2, that is T2*, can also be used. The corresponding magnetic resonance image datasets are designated, according to their contrast, as proton density-weighted, T1-weighted, T2-weighted or T2*-weighted. Other types of contrasts have also been proposed, for example, a diffusion-weighting.

For magnetic resonance image datasets, a large number of evaluating methods, or specifically evaluating algorithms are now known which can be used for automatic evaluation in the time period following recording. In order to cover many aspects, in the context of a single examination of a patient, typically a plurality of magnetic resonance image datasets with different magnetic resonance sequences, that is in particular, also different contrasts, are recorded. Accordingly, evaluating algorithms also exist, for example, post-processing applications which receive, as input information, a plurality of magnetic resonance image datasets of one examination with different contrasts. Such contrasts can comprise, for example, the following contrast types: T1, T2, T2*, proton density (these each with and without fat saturation), diffusion-weighted, perfusion-weighted, fluid-suppressed and magnetization-prepared. Magnetization preparations involve the use of different types of preparation pulses in order, for example, to suppress signals of particular spin types, for example, from fat or water. Quantitative magnetic resonance data, for example T1 maps, T2 maps, proton density maps, B0 maps or B1 maps can also be transferred as input information to evaluation algorithms of this type. These different contrasts can be present in different orientations. In the evaluation algorithm, it must therefore be known which magnetic resonance image dataset contains which contrast in order either to enable an assignment of the magnetic resonance image datasets in a predetermined, for example standardized, screen layout or to enable a correct further processing of the magnetic resonance data. A further processing of such magnetic resonance image datasets can comprise, for example, the calculation of ADC maps from diffusion-weighed magnetic resonance image datasets, the generation of synthetic contrasts from T1 maps, T2 maps and proton density maps and/or lesion segmentation on the basis of artificial intelligence, wherein of course other routes and results of evaluation algorithms are also possible.

In order to assign contrasts to incoming magnetic resonance image datasets, a manual input can be provided by a user. However, the use of lookup tables which are based upon particular keywords or metainformation, for example, DICOM attributes, has also been proposed. However, such an automatic process is very fault-prone since such textual data often differs between software versions, but in particular also between different software manufacturers and individual customer adaptations. Further problems can arise if protocol parameters or parameters of the magnetic resonance sequence have been changed, for example an echo time (TE) has been increased, but contrast-specific text in the protocol name (now T2 instead of proton density) has not been adapted.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the disclosure is to provide a robust and reliable possibility for assigning a contrast to a magnetic resonance image dataset.

This object is achieved by providing a computer-implemented method, an assigning facility, a computer program and an electronically readable data carrier according to present disclosure.

A computer-implemented method of the aforementioned type for assigning a contrast, according to the disclosure, may include:
  receiving input data comprising magnetic resonance data of the magnetic resonance image dataset,
  applying at least one trained assigning function to the input data, wherein output data comprising a contrast assigning information item is established, and
  providing the output data.

According to an exemplary embodiment of the disclosure, artificial intelligence may be used, such as one or more neural networks, in order to achieve a classification with regard to a contrast assignment to magnetic resonance image datasets, whereby a rapid and reliable assignment is enabled. In this way, an automated assignment of the respective image contrast to a number of magnetic resonance image datasets is therefore possible, so that errors in the rule-based assignment are prevented, a manufacturer-independent assignment option is provided and workflows can be improved overall.

In general, a trained function, and therefore also the trained assigning function, maps cognitive functions which humans associate with other human brains. By way of training based upon training data (machine learning), the trained function is in the position to adapt itself to new circumstances and to detect and extrapolate patterns.

In general, parameters of a trained function can be adapted by means of training. In particular, supervised learning, semi-supervised learning, unsupervised learning, reinforcement learning and/or active learning are used. In addition, representation learning (also known as "feature learning") can be used. In particular, the parameters of the trained functions can be adapted, in particular, iteratively by way of a plurality of training steps.

A trained function can comprise, for example, a neural network, a support vector machine (SVM), a decision tree and/or a Bayesian network, and/or the trained function can be based upon k-means clustering, Q-learning, genetic algorithms and/or assignment rules. In particular, a neural network can be a deep neural network, a convolutional neural network (CNN) or a convolutional deep CNN. Furthermore, the neural network can be an adversarial network, a deep adversarial network and/or a generative adversarial network (GAN).

Specifically, it can be provided for example that as a trained assigning function, a pre-trained function which has been trained by transfer learning with regard to the contrast assignment is used. In transfer learning, initially a pre-trained function that has been trained for a related problem is selected and then retrained by transfer learning to the problem actually to be solved, so that a significantly smaller quantity of training data is needed in order, nevertheless, to achieve an excellent result.

Particularly advantageously, the trained assigning function can comprise a convolutional neural network (CNN). Particularly advantageously, the CNN can be a residual neural network (ResNet), for example a ResNet-18 or a ResNet-34. A ResNet-18 has the advantage therein of providing a good compromise between accuracy and speed. Other ResNets are also excellently suited to image classification. Of course, however, other network architectures can also be accessed, for example a SqueezeNet and/or an AlexNet.

In general, it can be stated that CNNs, including those which can be used as a trained assigning function, have a convolutional base for generating features from the input data, in particular magnetic resonance image datasets, which in particular can comprise convolutional layers and pooling layers. Typically, a classifier then follows the convolutional base, which can contain one or more fully connected layers. The main aim of the classifier is the classification of the input data on the basis of the features extracted by means of the convolutional base. In other words, a classification in the classifier follows a feature extraction in the convolutional base, in order to provide the output data. A ResNet, short for "residual neural network" is distinguished in that deeper neural networks can be generated in that so-called "skip connections" or "shortcuts" are used in order to jump over layers. The numbers for identifying ResNets, that is for example, 18, 34 and the like, denote layers, although the architecture is the same. In a ResNet, two main types of blocks exist, specifically identity blocks if the input and output activation dimensions are the same and convolution blocks if the input and output activation dimensions are different. For example, in order to reduce the activation dimensions by a factor of two, a 1×1 convolution with a "stride" of two can be accessed. ResNet-18 comprises, for example, a plurality of convolutional blocks in the convolutional base which the classifier adjoins. For further information regarding ResNets, reference should additionally be made to the seminal article by K. He et al.: "Deep Residual Learning for Image Recognition", arXiv Preprint arXiv: 1512.03385, 2015.

Ultimately, all the contrasts/weightings occurring in modern magnetic resonance imaging can be used as contrasts. Thus, for example, it can be provided that the at least one contrast that can be assigned by way of the trained assigning function from the group comprising T1, T2, T2*, proton density-weighted, diffusion-weighed, perfusion-weighted and weighted by means of a preparation pulse is selected. Such contrasts and magnetic resonance sequences which entail the presence of this contrast in the magnetic resonance image datasets are already known in principle from the prior art and do not need to be described in detail here. It is crucial that these contrasts entail different image impressions or image contents, which can be differentiated and distinguished by artificial intelligence in the context of the present disclosure in order to enable the contrast assignment reliably and robustly. Therein, in the context of the present disclosure, it can be stated in general that the trained assigning function can use only magnetic resonance data of a subregion of the recording region as input data and/or in a magnetic resonance image dataset comprising a plurality of slice images, can use only a part of the slice images and/or that the magnetic resonance data of the input data is used spatially coarsened. In this regard, it can be remarked in general that magnetic resonance image datasets are often recorded as slice image stacks, therefore image series, wherein the slice images have a particular orientation, for example axial or the like. In the context of the present disclosure, it is now possible in order to reduce the quantity of input data items, to access only portions of the whole magnetic resonance image dataset, in particular representative portions. Put briefly, the classification by way of the at least one trained assigning function can be carried out on all the slice images of a magnetic resonance image dataset or only on subsections.

For data reduction, it is in particular also conceivable to carry out a spatial coarsening. Specifically, it can be provided for example, that for establishing the input data, the magnetic resonance image datasets are scaled down to a lower spatial resolution, in particular by more than 50%. In an exemplary embodiment, a square size of slice images can be accessed. Thus, the quantity of input data items for the trained assigning function can be significantly reduced without image information of the magnetic resonance image dataset having to be given up completely, as would be necessary when extracting sections. Despite such a preprocessed coarsening of the image information, it has been found that excellent results with a very good assignment of the contrast can still be achieved. In an exemplary embodiment, the scaling down may relate to the dimension in the slice image plane so that the number of slice images in the slice image stack of a magnetic resonance image dataset is suitably not altered.

In a first specific embodiment of the present disclosure, it can be provided that at least one trained assigning function is used, the contrast assigning information item of which comprises a classification information item for the magnetic resonance image dataset indicating a membership to one of a plurality of contrasts. Therefore, in this embodiment, an independent contrast classification of each individual magnetic resonance image dataset can take place. Herein, a trained assigning function, for example in a ResNet architecture, is put to use which supplies as the output value a contrast classification, for example "T1". Although this first embodiment is highly universal and, for example, can be utilized for mass classification of magnetic resonance image datasets, it is nevertheless possible that within magnetic resonance image datasets of a single examination of a patient, multiple assignments can take place. However, a particularly advantageous development can provide, in this regard, that a database with a plurality of magnetic resonance image datasets to be evaluated is provided for classification with regard to at least one predetermined contrast of the contrasts, wherein all the magnetic resonance image datasets are evaluated by applying the trained assigning function and the magnetic resonance image datasets classified as pointing to the predetermined contrast according to the output data are selected. Thus, as mentioned above, this first embodiment is particularly well suited to the mass classification. Herein, the selection of the magnetic resonance image datasets can particularly advantageously take place for training an evaluation function that is to be trained. This means that by means of this first embodiment, training data for other applications can be presorted if, for example, a user makes a database with magnetic resonance image datasets available to a developer.

In a second specific embodiment of the present disclosure, it can be provided that at least one trained assigning function is used, the contrast assigning information item of which states a probability for the presence of at least one contrast, wherein an assignment to a contrast takes place on the basis of a comparison with a threshold value and/or with at least one other probability of the contrast assignment information item. In an exemplary embodiment, in this relation, a ResNet architecture may also be used. Rather than a fixed classification result for all the contrasts handled, the ResNet architecture provides a regression value, that is, a probability between zero and one. In this case, for a plurality of magnetic resonance image datasets of a single examination of a patient, initially a probability evaluation of the image contrasts for all the magnetic resonance image datasets in succession can advantageously take place, after which for each contrast from all the output data, specifically contrast assigning information items, the maximum value can be established. Therein, particularly advantageously, it can specifically be provided that the trained assigning function is applied to a plurality of magnetic resonance image datasets and probabilities for a plurality of contrasts, the number of which corresponds at least to the number of the magnetic resonance image datasets, are established for each magnetic resonance image dataset, wherein for the assigning of the contrasts in succession for all the magnetic resonance image datasets, the contrast mapped therein is established as the maximum of the probabilities for this magnetic resonance image dataset, wherein probabilities for contrasts already assigned to a magnetic resonance image dataset are not taken into account. In other words, as soon as a contrast has been assigned on the basis of the maximum probability value, a selection can be made only from the remaining contrasts. This is particularly advantageous if each contrast is present only once and a correct 1:1 assignment to the relevant image series is required. In this way, therefore a multiple assignment can particularly advantageously be prevented.

For the first and the second embodiment, it can be provided particularly advantageously that the trained assigning function is trained with training data which comprises magnetic resonance image datasets and an additional information item indicating the membership to one of the at least one contrasts. Suitably, therefore magnetic resonance image datasets in which not all the contrasts are present for the corresponding test subjects can also be used as training data, so that the number of training data items is extremely large. In the second embodiment, the training takes place in particular such that the additional information which is the relevant training information for contrast assigning information is selected such that for the known contrast present in the training magnetic resonance image dataset, the probability is set to one and all the other probabilities are set to zero.

In an exemplary embodiment of the present disclosure, it can be provided that from magnetic resonance image datasets assigned to at least two different contrasts, input data for a single use of the trained assigning function is established, the contrast assigning information of which is a classification information item for each magnetic resonance image dataset indicating a membership to one of a plurality of contrasts. Therein, in an exemplary embodiment, a different contrast and therefore the membership to a particular contrast class is assigned to each magnetic resonance image dataset. In other words, a concatenation of the input contrasts, and therefore of the magnetic resonance image datasets, takes place in a separate dimension for forming the input data so that a common feeding into the input layer of the trained assigning function takes place. The output of the classification and therefore the output contrast assigning information item can then take place, for example, as a vector, for example [PD T1 T2], which contains the sequence of the detected contrasts according to the sequence of the input of the magnetic resonance image datasets. This embodiment has the particular advantage that during the training, the trained assigning function can learn associations between the individual contrasts and advantageously can take account of these for the classification.

Particularly advantageously, it can therein be provided that magnetic resonance data of the magnetic resonance image datasets showing the same anatomy, in particular the same slice, can be grouped together to a multi-channel input dataset of the input data, wherein the classification information item is a vector assigning the magnetic resonance image datasets, sorted according to their channels, to a contrast. Therein, in particular RGB channels can be used as the channels. By way of example, therefore, magnetic resonance data of a first contrast that is to be classified in a first channel, can be assigned in particular to the red color channel, magnetic resonance data of a further contrast to be classified can be assigned to a second channel, for example, the green color channel and magnetic resonance data of a third contrast that is to be classified can be assigned to a third channel, for example, the blue color channel. In the RGB case therefore, the different color channels (red, green, blue) are filled with magnetic resonance data of the magnetic resonance image datasets relating to the same voxel. For example, corresponding slice images of a corresponding slice image stack can be sorted into the channels. In a specific exemplary embodiment, it can therefore be provided that slice images of the first magnetic resonance image dataset can be placed in the red color channel and slice images of the second magnetic resonance image dataset can be placed in the green color channel and slice images of the third magnetic resonance image dataset can be placed in the blue color channel. If only two magnetic resonance image datasets are used, the blue color channel can be left empty or discarded.

Particularly advantageously, however, it is also possible, given a number of channels that is greater than the number of magnetic resonance image datasets, to use at least one of the channels not used for a magnetic resonance image dataset for a linear combination dataset formed, in particular by linear combination from the magnetic resonance image datasets. For example, a linear transformation of slice images of different magnetic resonance image datasets showing the same slice can be carried out, for example, an addition or subtraction in order to insert this result for two magnetic resonance image datasets into the third channel, which extends the learning base and later the evaluating base.

For this third embodiment, it can be provided that the trained assigning function is trained with training data which comprises groups of magnetic resonance image datasets and an additional information item indicating the membership of all the magnetic resonance image datasets of a group to one contrast, in particular again corresponding to the contrast assigning information item. In other words, the training in this third embodiment takes place by way of creating multiples of magnetic resonance image datasets of the same subject with corresponding multiples of output classification and therefore comparative information relating to the contrast assigning information. It can therein be provided, particularly advantageously, that for generating additional training data, a permutation of the magnetic resonance image datasets of the groups takes place. In other words, for multiplication of the training data, a permutation of the input and output multiples can take place in the training data. Finally, therefore, the assigning of the individual magnetic resonance image datasets to the channels is exchanged since it has been found that by way of such an artificial coarsening of the training data overall, more exact predictions can be made regarding the assigning to contrasts.

A suitable general development of the disclosure can provide that the input data additionally comprises at least one recording parameter used during the recording of the respective magnetic resonance image dataset. This means that metainformation which can be derived in particular from DICOM attributes can also be transferred to the trained assigning function in order to increase further the accuracy of the detection and classification. The recording parameters can describe, in particular, the magnetic field strength of the main magnet field, the sequence type of the magnetic resonance sequence used, the image orientation, the repetition time (TR), the echo time (TE) and/or the flip angle. The at least one recording parameter can suitably be read out from a file of the magnetic resonance image dataset stored, in particular, in the DICOM format. Especially in the use of the DICOM standard, it is known to add metainformation in a file of the magnetic resonance image dataset.

The contrast assigning information item can be used in different ways in the context of the present disclosure. Already mentioned as an example is the selection of magnetic resonance image datasets that can be used as training data for evaluating functions of the artificial intelligence that are to be trained, in particular from a large database. Particularly useful, however, in the context of a method for evaluating a group of magnetic resonance image datasets from the same patient, is the use of the assigning method according to the disclosure which can be recorded, in particular, during a single examination. Then, initially the corresponding contrasts can be assigned to the magnetic resonance image datasets with the assigning method according to the disclosure, wherein then the magnetic resonance image datasets are used, together with the contrast assigning information item as input information for a further evaluating algorithm which can also be a trained evaluating function of the artificial intelligence. In other words, the at least one magnetic resonance image dataset can be further evaluated after the assigning, by means of at least one evaluating algorithm which uses an assigning of the magnetic resonance image datasets to contrasts as input information, to establish an evaluating result. Examples of this are, as mentioned in the introduction, the establishment of ADC maps from diffusion-weighed magnetic resonance data, the generation of synthetic contrasts and the segmentation, in particular, based upon artificial intelligence, of lesions for example.

If the assigning step forms part of an evaluating algorithm, in particular therefore a post processing application, for which, in particular, the second and third embodiment are useful, an implementation can take place in a corresponding evaluating facility. An implementation at a central location is also possible, for example, in a DICOM unit at the magnetic resonance facility or on a computing facility of an archiving system, for example, a PACS.

Apart from the method, the disclosure also relates to an assigning facility for assigning at least one contrast to at least one magnetic resonance image dataset of a recording region of a patient, wherein the contrast exists due to the use of a contrast-specific magnetic resonance sequence during the recording, having
  a first interface for receiving input data comprising magnetic resonance data of the magnetic resonance image dataset,
  an assigning unit for applying at least one trained assigning function to the input data, wherein output data comprising a contrast assigning information item is established, and
  a second interface for providing the output data.

In other words, the assigning facility, which comprises in general at least one processor and/or at least one storage means, is configured for carrying out the assigning method according to the disclosure. All the embodiments relating to the method according to the disclosure can be transferred similarly to the inventive assigning facility with which the advantages mentioned above can therefore also be obtained.

The assigning facility can be implemented, as shown, for example as part of an evaluating facility. For example, the assigning facility can be used as part of a control facility of a magnetic resonance facility in order to be used in the post-processing. However, it is also conceivable to provide the assigning facility, for example, as part of an input module of an archiving system, in particular PACS, so that a contrast can be directly assigned to ingoing magnetic resonance image datasets and the corresponding contrast assigning information item can be stored. Other embodiments are of course also conceivable.

A computer program according to the disclosure is directly loadable into a memory store of a computing facility, in particular an assigning facility, and has program means in order to carry out the steps of an inventive method when the computer program is executed in the computing facility. The computer program can be stored on an electronically readable data carrier according to the disclosure which therefore comprises control information stored thereon, which comprises the at least one computer program according to the disclosure and is configured, on use of the data carrier in a computing facility, cause said control information to carry out the inventive method. The data carrier can be, in particular, a non-transient data carrier, for example, a CD-ROM.

Figure 1:
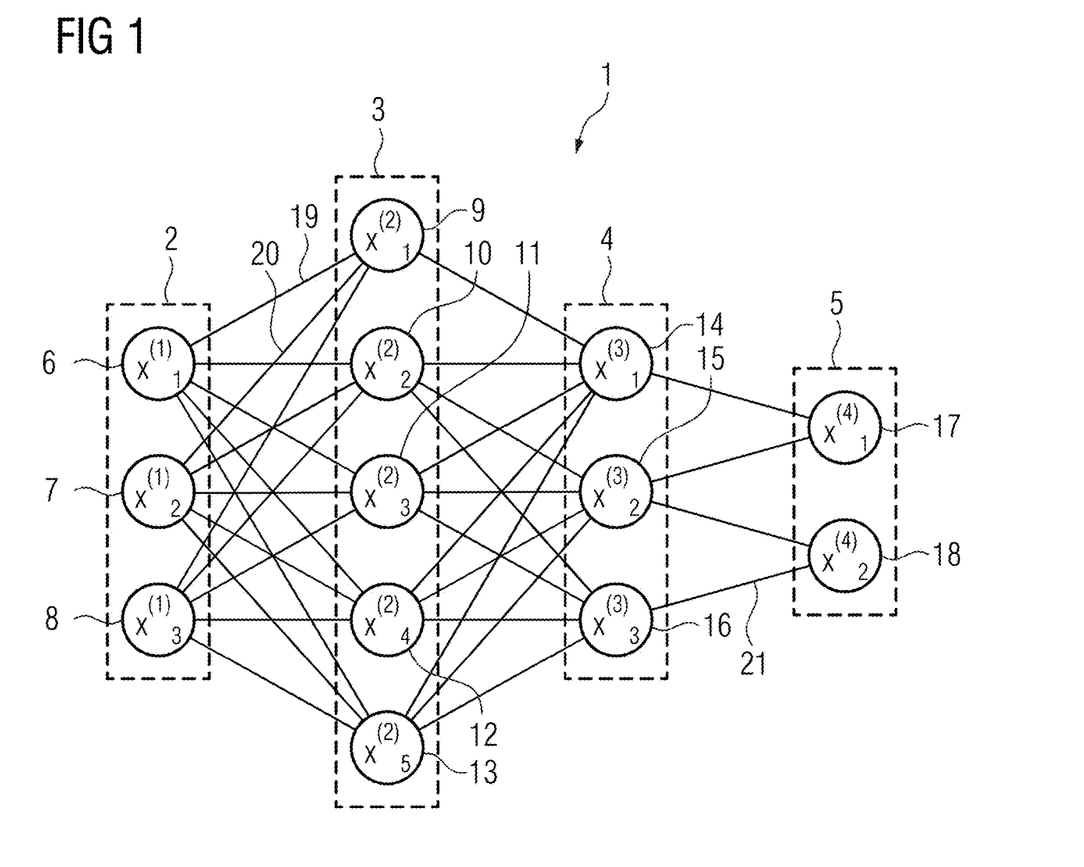
FIG. 1 shows an artificial neural network according to an exemplary embodiment of the present disclosure.

FIG. 1 shows an exemplary embodiment of an artificial neural network 1. Other expressions for the artificial neural network 1 are "neural network," "artificial neural net," or "neural net."

The artificial neural network 1 comprises nodes 6 to 18 and edges 19 to 21, wherein each edge 19 to 21 is a directed connection from a first node 6 to 18 to a second node 6 to 18. In general, the first node 6 to 18 and the second node 6 to 18 are different nodes 6 to 18, but it is also conceivable that the first node 6 to 18 and the second node 6 to 18 are identical. For example, in FIG. 1, the edge 19 is a directed connection from the node 6 to the node 9 and the edge 21 is a directed connection from the node 16 to the node 18. An edge 19 to 21 from the first node 6 to 18 to a second node 6 to 18 is designated an "ingoing edge" for the second node 6 to 18 and as an "outgoing edge" for the first node 6 to 18.

In this exemplary embodiment, the nodes 6 to 18 of the artificial neural network 1 can be arranged in layers 2 to 5, wherein the layers can have an intrinsic order which is introduced by the edges 19 to 21 between the nodes 6 to 18. In particular, edges 19 to 21 can only be provided between adjacent layers of nodes 6 to 18. In the exemplary embodiment shown, there exists an input layer 110 which has only the nodes 6, 7, 8, in each case without an ingoing edge. The output layer 5 comprises only the nodes 17, 18 each without outgoing edges, wherein furthermore, hidden layers 3 and 4 lie between the input layer 2 and the output layer 5. In the general case, the number of hidden layers 3, 4 can be selected arbitrarily. The number of nodes 6, 7, 8 of the input layer 2 typically corresponds to the number of input values into the neural network 1 and the number of the nodes 17, 18 in the output layer 5 typically corresponds to the number of the output values of the neural network 1.

In particular, a (real) number can be assigned to the nodes 6 to 18 of the neural network 1. Therein, x(n)i denotes the value of the i-th node 6 to 18 of the n-th layer 2 to 5. The values of the nodes 6, 7, 8 of the input layer 2 are equivalent to the input values of the neural network 1, while the values of the nodes 17, 18 of the output layer 5 are equivalent to the output values of the neural network 1. Furthermore, each edge 19, 20, 21 can be assigned a weight in the form of a real number. In particular, the weight is a real number in the interval [−1, 1] or in the interval [0, 1]. Therein, w(m,n)i,j denotes the weight of the edge between the i-th nodes 6 to 18 of the m-th layer 2 to 5 and the j-th nodes 6 to 18 of the n-th layer 2 to 5. Furthermore, the abbreviation $w_{i,j}^{(n)}$ is defined for the weight $w_{i,j}^{(n,n+1)}$.

In order to calculate output values of the neural network 1, the input values are propagated by the neural network 1. In particular, the values of the nodes 6 to 18 of the (n+1)-th layer 2 to 5 can be calculated on the basis of the values of the nodes 6 to 18 of the n-th layer 2 to 5 with $$x_j^{(n+1)} = f(\Sigma_i x_i^{(n)} \cdot w_{i,j}^{(n)}).$$

Therein, f is a transfer function which can be designated the activation function. Known transfer functions are step functions, sigmoid functions (for example, the logistical function, the generalized logical function, the hyperbolic tangent, the arctangent, the error function, the smoothstep function) or rectifiers. The transfer function is substantially used for normalizing purposes.

In particular, the values are propagated layerwise by way of the neural network 1, wherein values of the input layer 2 are given by way of the input data of the neural network 1. Values of the first hidden layer 3 can be calculated on the basis of the values of the input layer 2 of the neural network 1, and values of the second hidden layer 4 can be calculated on the basis of the values in the first hidden layer 3, etc.

In order to be able to specify the values $w_{i,j}^{(n)}$ for the edges 19 to 21, the neural network 1 must be trained using training data. In particular, training data comprises training input data and training output data which are denoted below as $t_i$. For a training step, the neural network 1 is applied to the training input data in order to establish calculated output data. In particular, the training output data and the calculated output data comprise a number of values, wherein the number is determined as the number of the nodes 17, 18 of the output layer 5.

In particular, a comparison between the calculated output data and the training output data is used to adapt recursively the weights within the neural network 1 ("back-propagation algorithm"). In particular, the weights can be amended according to:

$$w_{i,j}^{(n)} = w_{i,j}^{(n)} - \gamma \cdot \delta_j^{(n)} \cdot x_i^{(n)}$$

wherein γ is a learning rate and the numbers $\delta_j^{(n)}$ can be calculated recursively according to $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

on the basis of $\delta_j^{(n+1)}$ when the (n+1)-th layer is not the output layer 5, and $$\delta_j^{(n)} = (x_k^{(n+1)} - t_j^{(n+1)}) \cdot f(\Sigma_i x_i^{(n)} \cdot w_{i,j}^{(n)})$$

if the (n+1)-th layer is the output layer 5, wherein f is the first derivative of the activation function and $y_j^{(n+1)}$ is the comparative training value for the j-th nodes 17, 18 of the output layer 5.

An example will now be given for a convolutional neural network (CNN), referring to FIG. 2. It should be noted here that the expression "layer" is used therein in a slightly different way than for classical neural networks. For a classical neural network, the expression "layer" merely indicates the set of nodes which form a layer and therefore a particular generation of nodes. For a convolutional neural network, the expression "layer" is often used as an object which actively changes data, in other words as a set of nodes of the same generation and either the set of ingoing or outgoing edges.

Figure 2:
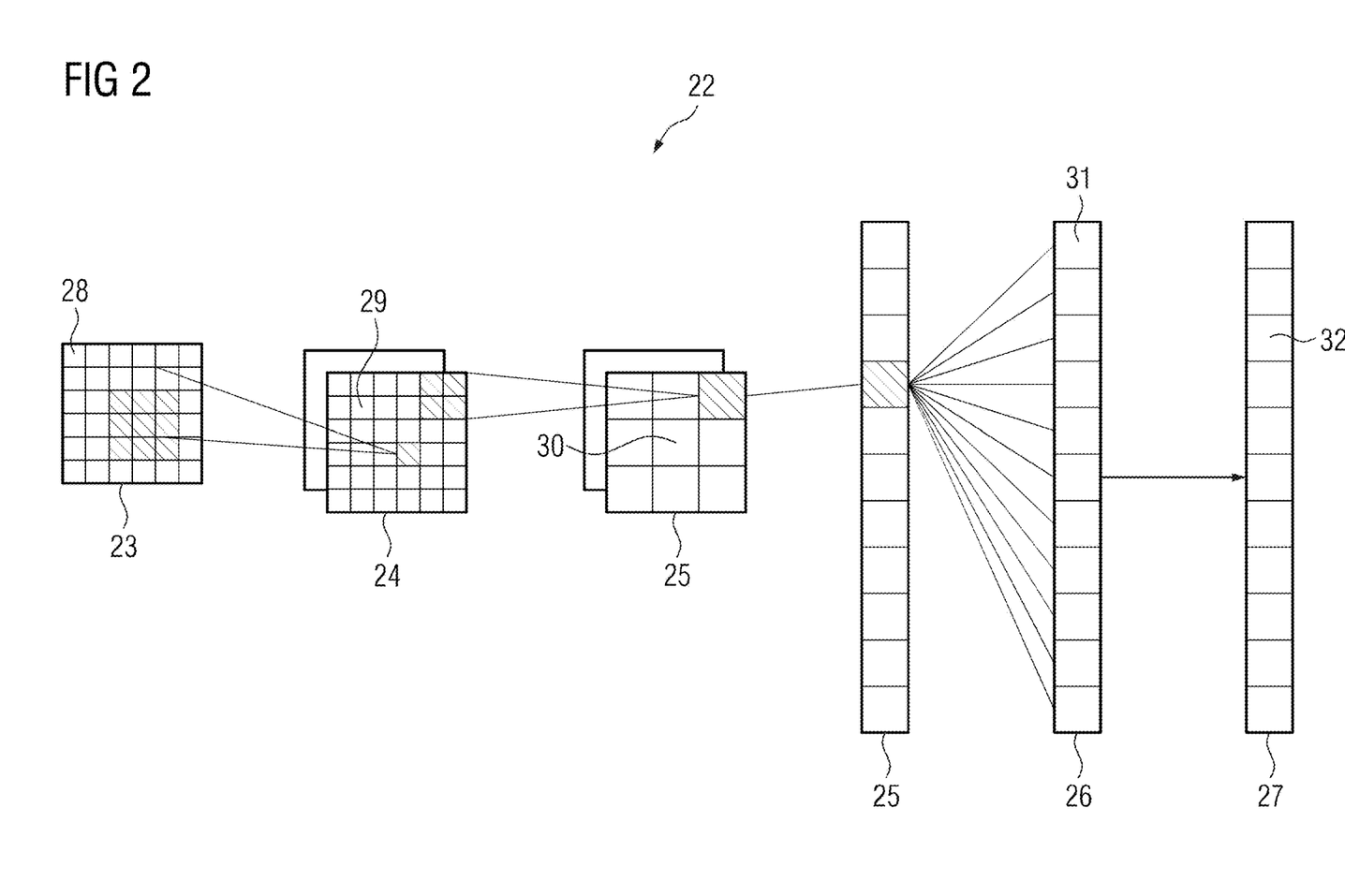
FIG. 2 shows a convolutional neural network according to an exemplary embodiment of the present disclosure.

FIG. 2 shows an exemplary embodiment of a convolutional neural network 22. In the exemplary embodiment shown, the convolutional neural network 22 comprises an input layer 23, a convolutional layer 24, a pooling layer 25, a completely connected layer 26 and an output layer 27. In alternative embodiments, the convolutional neural network 22 can contain a plurality of convolutional layers 24, a plurality of pooling layers 25 and a plurality of completely connected layers 26, exactly like other types of layers. The sequence of the layers can be selected as desired, wherein typically completely connected layers 26 form the last layers before the output layer 27.

In particular, within a convolutional neural network 22, the nodes 28 to 32 of one of the layers 23 to 27 can be understood as being arranged in a d-dimensional matrix or as a d-dimensional image. In particular, in the two-dimensional case, the value of a node 28 to 32 can be denoted with the indices i,j in the n-th layer 23 to 27 as x(n)[i,j]. It should be noted therein that the arrangement of the nodes 28 to 31 of a layer 23 to 27 has no effect on the calculations within the convolutional neural network 22 as such, since these effects are produced entirely by the structure and the weights of the edges.

A convolutional layer 24 is distinguished, in particular, in that the structure and the weights of the ingoing edges form a convolution operation on the basis of a particular number of kernels. In particular, the structure and the weights of the ingoing edges can be selected such that the values $x_k^{(n)}$ of the nodes 29 of the convolutional layer 24 are established as a convolution $x_k^{(n)} = K_1 * x^{(n-1)}$ on the basis of the values $x^{((n-1))}$ of the nodes 28 of the preceding layer 23, wherein the convolution * in the two-dimensional case can be defined as $$x_k^{(n)}[i,j] = *K_k * x^{(n-1)})[i,j] = \Sigma_i \Sigma_j K_k[i',j'] \cdot x^{(n-1)}[i-i',j-j'].$$

Therein, the k-th kernel Kk is a d-dimensional matrix, in this exemplary embodiment a two-dimensional matrix which is typically small in comparison with the number of the nodes 28 to 32, for example, a 3×3 matrix or a 5×5 matrix. In particular, this implies that the weights of the ingoing edges are not independent, but rather are selected such that they generate the above convolution equation. In the example for a kernel which forms a 3×3 matrix, there exist only nine independent weights (wherein each entry of the kernel matrix represents an independent weight), regardless of the number of nodes 28 to 32 in the corresponding layer 23 to 27. In particular for a convolutional layer 24, the number of nodes 29 in the convolutional layer 24 is equivalent to the number of nodes 28 in the preceding layer 23 multiplied by the number of convolution kernels.

If the nodes 28 of the preceding layer 23 are arranged as a d-dimensional matrix, the use of the plurality of kernels can be understood as adding a further dimension which is also designated the depth dimension, so that the nodes 29 of the convolutional layer 24 are arranged as a (d+1)-dimensional matrix. If the nodes 28 of the preceding layer 23 are already arranged as a (d+1)-dimensional matrix with a depth dimension, the use of a plurality of convolution kernels can be understood as an expansion along the depth dimension, so that the nodes 29 of the convolutional layer 24 are likewise arranged as a (d+1)-dimensional matrix, wherein the size of the (d+1)-dimensional matrix in the depth dimension is larger by the factor formed by the number of the kernels than in the preceding layer 23.

The advantage of the use of convolutional layers 24 is that the spatially local correlation of the input data can be utilized in that a local connecting pattern is created between nodes of adjacent layers, in particular in that each node has connections only to a small region of the nodes of the preceding layer.

In the exemplary embodiment shown, the input layer 23 comprises thirty-six nodes 28 which are arranged as a two-dimensional 6×6 matrix. The convolutional layer 24 comprises seventy-two nodes 29 which are arranged as two two-dimensional 6×6 matrices, wherein each of the two matrices is the result of a convolution of the values of the input layer 23 with a convolution kernel. In the same way, the nodes 29 of the convolutional layer 24 can be understood as being arranged in a three-dimensional 6×6×2 matrix, wherein the last-mentioned dimension is the depth dimension.

A pooling layer 25 is distinguished in that the structure and the weights of the ingoing edges and the activation function of its nodes 30 define a pooling operation on the basis of a non-linear pooling function f. For example, in the two-dimensional case, the values x(n) of the nodes 30 of the pooling layer 25 can be calculated on the basis of the values x(n+1) of the nodes 29 of the preceding layer 24 as $$x^{(n)}[i,j] = f(x^{(n-1)}[id_1,jd_2], \ldots, x^{(n-1)}[id_1+d_1-1,jd_2+d_2-1]).$$

In other words, by way of the use of a pooling layer 25, the number of nodes 29, 30 can be reduced in that a number d1×d2 of adjacent nodes 29 in the preceding layer 24 are replaced by a single node 30 which is calculated as a function of the values of said number of adjacent nodes 29. In particular, the pooling function f can be a maximum function, an averaging or the L2 norm. In particular, for a pooling layer 25, the weights of the ingoing edges can be specified and not modified by training.

The advantage of the use of a pooling layer 25 is that the number of nodes 29, 30 and the number of parameters is reduced. This leads to a reduction of the required calculation quantity within the convolutional neural network 22 and thus to control of the overfitting.

In the exemplary embodiment shown, the pooling layer 25 is a max pooling layer in which four adjacent nodes are replaced with just one single node, the value of which is formed by the maximum of the values of the four adjacent nodes. The max pooling is applied to each d-dimensional matrix of the preceding layer; in this exemplary embodiment, the max pooling is applied to each of the two two-dimensional matrices so that the number of the nodes is reduced from seventy-two to eighteen.

A completely connected layer 26 is distinguished in that a plurality of, in particular all, the edges between the nodes 30 of the preceding layer 25 and the nodes 31 of the completely connected layer 26 are present, wherein the weight of each of the edges can be individually adapted. In this exemplary embodiment, the nodes 30 of the preceding layer 25 and the completely connected layer 26 are shown both as two-dimensional matrices and also as non-coherent nodes (shown as one row of nodes, wherein the number of the nodes has been reduced for better clarity). In this exemplary embodiment, the number of the nodes 31 in the completely connected layer 26 is equal to the number of the nodes 30 in the preceding layer 25. In alternative embodiments, the number of the nodes 30, 31 can be different.

Furthermore, in this exemplary embodiment, the values of the nodes 32 of the output layer 27 are determined in that the Softmax function is applied to the values of the nodes 31 of the preceding layer 26. By applying the Softmax function, the sum of the values of all the nodes 32 of the output layer 27 is one and all the values of all the nodes 32 of the output layer are real numbers between 0 and 1. If the convolutional neural network 22 is used for classifying input data, in particular the values of the output layer 27 can be interpreted as a probability that the input data falls into one of the different classes.

A convolutional neural network 22 can likewise have a ReLU layer, wherein ReLU is an acronym for "rectified linear units". In particular, the number of the nodes and the structure of the nodes within an ReLU layer is equivalent to the number of the nodes and the structures of the nodes of the preceding layer. The value of each node in the ReLU layer can be calculated, in particular, by applying a rectifier function to the value of the corresponding node of the preceding layer. Examples for the rectifier functions are $f(x)=\max(0,x)$, the hyperbolic tangent or the sigmoid function.

Convolutional neural networks 22 can be trained, in particular, on the basis of the back-propagation algorithm. In order to prevent an overfitting, regularization methods can be used, for example, dropout of individual nodes 28 to 32, stochastic pooling, use of synthetic data, weight decay on the basis of the L1 or L2 norm or maximum norm restrictions.

Figure 3:
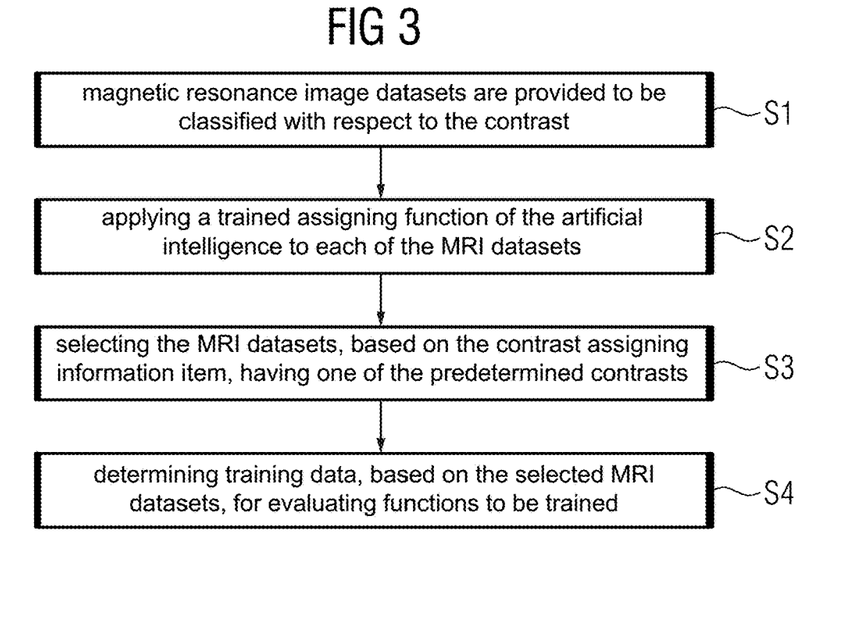
FIG. 3 shows a flowchart of a method according to an exemplary embodiment of the present disclosure.

FIG. 3 shows a flow plan to illustrate a first exemplary embodiment of the method according to the disclosure. There, in a step S1, a database is provided with a plurality of magnetic resonance image datasets to be classified with respect to the contrast. From this database, magnetic resonance image datasets of a particular contrast are to be used as training data for training one or more evaluating functions of the artificial intelligence. If, for example, a first evaluating function is to be trained which uses as input information diffusion-weighed magnetic resonance image datasets, then "diffusion-weighted" can be a first predetermined contrast and if a further evaluating function is to be trained which uses T2*-weighted magnetic resonance image datasets as input information, then "T2*-weighted" can be a second predetermined contrast.

In order to select the correct magnetic resonance image datasets, a trained assigning function of the artificial intelligence is applied to each of the magnetic resonance image datasets in the database in a step S2 in order to establish output data which comprises a contrast assigning information item. The contrast assigning information item defines, in the present case, which contrast is present in the magnetic resonance image dataset according to the result of the trained assigning function, for example "T2*", "PD" or the like. In the present case, the trained assigning function therein comprises a ResNet wherein of course other architectures can also be used, for example SqueezeNet or AlexNet. The trained assigning function has been trained by way of training data, wherein each training dataset contains a magnetic resonance image dataset for which the contrast is known and contains the corresponding contrast assigning information item as additional information.

In a step S3, the magnetic resonance image datasets are selected, for which according to the contrast assigning information item, one of the predetermined contrasts is present. These can then be used in a step S4 as training data for the evaluating functions/algorithms to be trained.

Therefore, an automatic sorting of a large database extremely quickly is possible in order to prepare such a training process.

Figure 4:
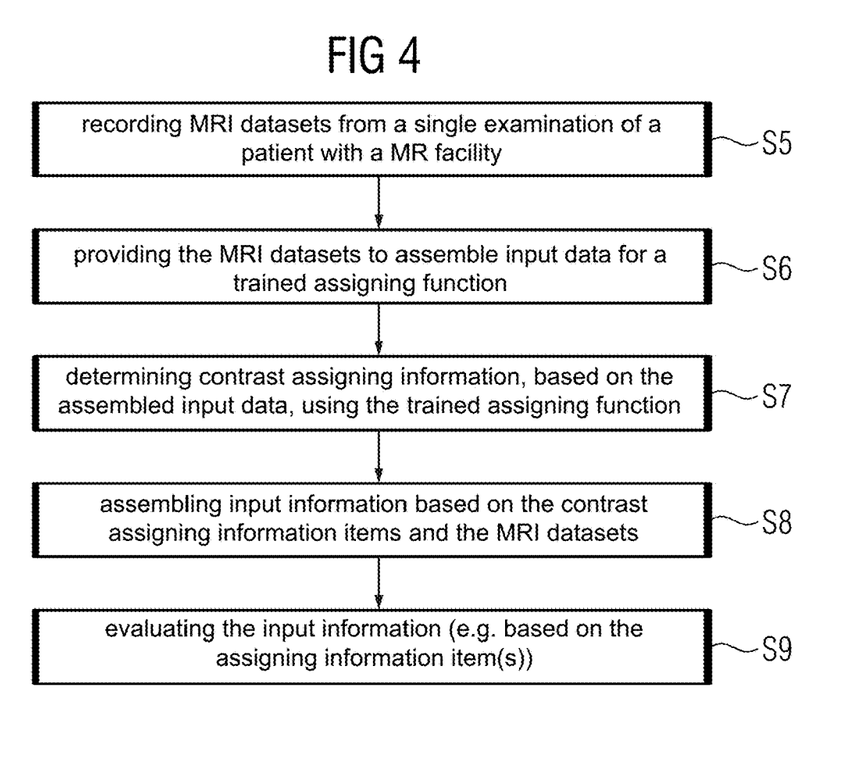
FIG. 4 shows a flowchart of a method according to an exemplary embodiment of the present disclosure.

FIG. 4 shows a flow diagram of a second exemplary embodiment in that the assigning method according to the disclosure is embedded into an evaluating method. The evaluating method uses an evaluating algorithm, for example a trained evaluating function which uses as input information magnetic resonance image datasets of different contrasts, wherein however, it must be clear which magnetic resonance image dataset corresponds to which contrast.

In a step S5, in a single examination of the patient with a magnetic resonance facility (MR scanner), a plurality of magnetic resonance image datasets, for example three magnetic resonance image datasets of a recording region of the patient are recorded. For example, it may be a T1-weighted magnetic resonance image dataset, a T2-weighted magnetic resonance image dataset and a proton density-weighted magnetic resonance image dataset. For example, the evaluating algorithm can derive therefrom in the form of a trained evaluating function, a segmentation or classification of a lesion. However, for this purpose, it must be known exactly which magnetic resonance image dataset shows which contrast.

The magnetic resonance image datasets are provided in step S6 and used for assembling input data for a trained assigning function. In order to assemble the input data, corresponding magnetic resonance data of the different magnetic resonance image datasets is assigned to different channels, in this case for example RGB channels. In the case of three magnetic resonance image datasets, as shown by way of example, the first magnetic resonance image dataset is placed in the red channel, the second magnetic resonance image dataset in the green channel and the third magnetic resonance image dataset in the blue channel. In this way, a dimension that is already present—the color dimension—is used for concatenation of the magnetic resonance image datasets in order then to be transferred together in a step S7 to the input layer of the trained assigning function. In the present exemplary embodiment, a ResNet-18 is used herein. However, other embodiments are also conceivable, for example with another ResNet, a SqueezeNet or an AlexNet.

In this case, as the contrast assigning information item of the output data, the trained assigning function supplies a vector which contains the established contrasts in the sequence in which the magnetic resonance image datasets have filled the channels, for example [PD T1 T2]. A 1:1 assignment takes place. During the learning, wherein additional training data has been obtained by way of permutations in the groups of magnetic resonance image datasets and contrasts which are used as training data, associations between the individual contrasts have thus already been learned and can therefore now advantageously be used for the classification. Specifically, the training of the trained assigning function takes place such that multiples of magnetic resonance image datasets of the same subjects have been used with corresponding multiples of contrasts as training data.

The contrast assigning information items obtained can then be used in step S8 in order, together with the magnetic resonance image datasets, to assemble completely the input information for the evaluating algorithm, which, using the knowledge regarding which contrast exists in which magnetic resonance image dataset, can carry out its evaluation in step S9.

It should be noted that, as an alternative to the variant discussed in relation to FIG. 4 in which all the magnetic resonance image datasets are transferred together as input data to the trained assigning function, an embodiment is also conceivable in which only ever one magnetic resonance image dataset is evaluated by way of a modified trained assigning function which then outputs, as contrast assigning information items for each observed contrast, a probability that this contrast is present (regression value of 0-1). Then, for each magnetic resonance image dataset in sequence, the maximum of these probabilities is found and specified as a contrast present in this magnetic resonance image dataset. For subsequently observed magnetic resonance image datasets, this contrast then falls away during the maximum observation, so that here also a 1:1 assignment results.

In general, it can be stated that it is entirely conceivable that the trained assigning function in exemplary embodiments of the present disclosure evaluates the whole magnetic resonance image dataset in each case. However, it can be advantageous if only parts of the magnetic resonance data of each magnetic resonance image dataset are observed. In an exemplary embodiment, a coarsening of the spatial resolution takes place in order to reduce the quantity of input data items and thus to provide an enhanced degree of robustness. Furthermore, in all the exemplary embodiments described here it is suitable to use as input data, in addition at least one recording parameter which can be contained as metainformation in the file in which the magnetic resonance image dataset is stored. If the magnetic resonance image datasets are present, for example, as files in the DICOM standard, there exist DICOM attributes which define, for example, the field strength, the sequence type, the image orientation, TR and TE times and flip angles, which represents a useful information item which further enhances the accuracy of the classification.

Figure 5:
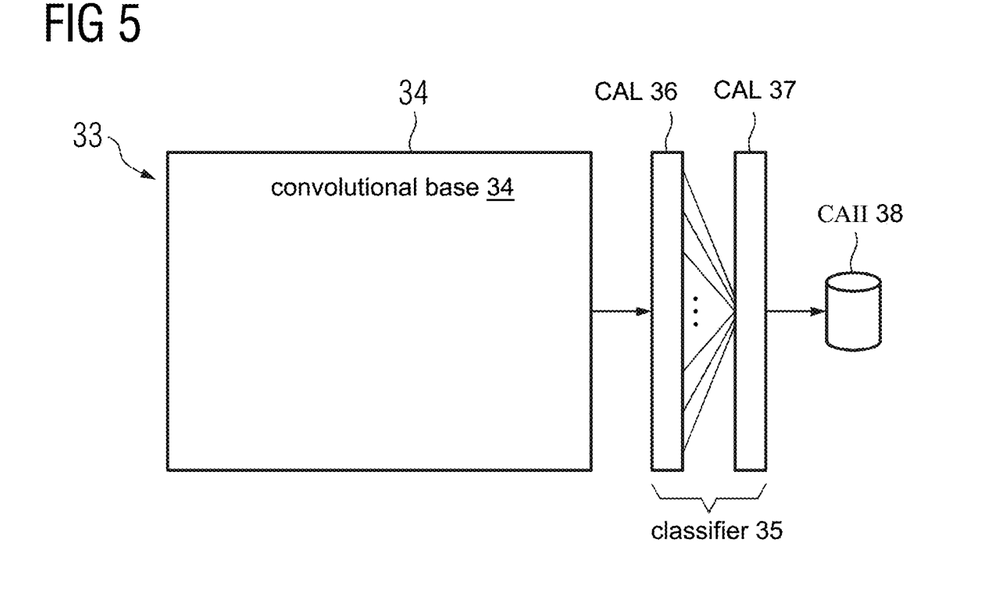
FIG. 5 schematically shows the structure of a trained assigning function according to an exemplary embodiment of the present disclosure.

In an exemplary embodiment, it can also be stated that the trained assigning function may contain a CNN 22. In an exemplary embodiment, the trained assigning function may contain a ResNet. An exemplary structure of the trained assigning function 33 is shown in FIG. 5. The trained assigning function 33, in the present case a ResNet-18, comprises a convolutional base 34 which, as known in principle, is mainly constructed from convolutional layers 24 and pooling layers 25. Following the classifier 35 is the convolutional base 34 which, in the present case has a first completely connected layer 36 and a second completely connected layer 37, wherein the information of the nodes of the layer 37 is used to establish the contrast assigning information item 38.

In the context of the assigning step (step S2 or S7), the trained assigning function 33 receives input data comprising magnetic resonance data concerning the at least one magnetic resonance image dataset and supplies the contrast assigning information item 38 as output data. In the convolutional base 34, as is known in principle, so-called "skip connections" can be used.

Figure 6:
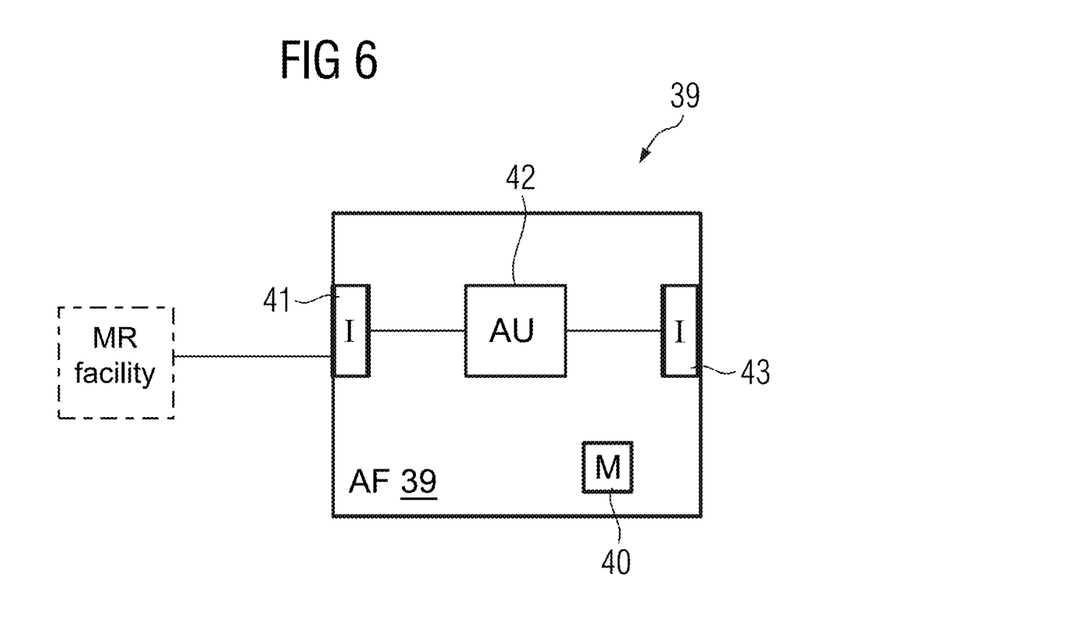
FIG. 6 shows an assigning facility according to an exemplary embodiment of the present disclosure.

FIG. 6 shows an outline of the principle of an assigning facility 39 according to the disclosure, which is configured for carrying out the assigning method according to the disclosure and can be implemented, for example, as part of an evaluating facility and/or a control facility (e.g. controller) of a magnetic resonance facility, and in particular therefore in the case of the second exemplary embodiment, can serve as part of the postprocessing pipeline. The magnetic resonance (MR) facility may include a controller and a MR scanner configured to record the magnetic resonance dataset from the patient. The controller of the MR facility may be configured to control the MR scanner to perform MR measurements/sequences to obtain the magnetic resonance dataset. The controller of the magnetic resonance facility may include processing circuitry that is configured to perform the functions/operations of the controller.

The assigning facility 39 can also be integrated into other computing facilities and/or formed thereby, for example, in the case of the first exemplary embodiment, by way of a system portion receiving the database of magnetic resonance image datasets, for example, an archiving system (PACS). In an exemplary embodiment, the assigning facility 39 includes processing circuitry that is configured to perform one or more functions of the assigning facility 39. In an exemplary embodiment, one or more components of the assigning facility 39, such as the assigning unit 42, includes processing circuitry that is configured to perform one or more respective functions and/or operations of the component(s). The assigning facility 39 may be referred to as a controller, processing device, or computing device (computer).

For the realizing of function units, the assigning facility 39 has at least one processor and at least one storage means (memory) 40. Via a first interface 41, the at least one magnetic resonance image dataset to be classified with regard to its contrast can be received. In an assigning unit 42, the trained assigning algorithm is applied, wherein the contrast assigning information item 30 arising can be provided to a second interface 43. The assigning unit 42 can also have as subunits, for example, an input data assembly unit in which a plurality of magnetic resonance image datasets is assigned to different channels in order to form a common input dataset for all the magnetic resonance image datasets.

Although the disclosure has been illustrated and described in detail by way of the exemplary embodiment, the disclosure is not restricted by the examples disclosed and other variations can be derived therefrom by a person skilled in the art without departing from the protective scope of the disclosure.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A computer-implemented method for assigning at least one contrast to at least one magnetic resonance image dataset of a recording region of a patient, wherein the at least one contrast exists due to use of a contrast-specific magnetic resonance sequence during the recording, the method comprising:

receiving, by an assigning facility, input data including magnetic resonance data of the magnetic resonance image dataset;

applying, by the assigning facility, at least one trained assigning function to the input data to generate output data including a contrast assigning information item, wherein the contrast assigning information item defines which contrast is present in the magnetic resonance image dataset and includes a probability of a presence of at least one contrast, an assignment to a contrast taking place based on a comparison of the probability with a threshold value and/or with at least one other probability of the contrast assignment information item, wherein:

the trained assigning function is applied to a plurality of magnetic resonance image datasets and probabilities for a plurality of contrasts, a number of which corresponds at least to a number of the plurality of magnetic resonance image datasets, are established for each magnetic resonance image dataset, to assign the contrasts in succession for all the magnetic resonance image datasets, a contrast mapped therein is established as a maximum of the probabilities for this magnetic resonance image dataset, and probabilities for contrasts already assigned to a magnetic resonance image dataset are not considered; and generating, by the assigning facility, an output data file including the output data and making the output data file available in electronic form.

2. The method as claimed in claim 1, wherein the trained assigning function comprises a convolutional neural network or a residual neural network (ResNet).

3. The method as claimed in claim 1, wherein the at least one contrast assignable by the trained assigning function is T1, T2, T2*, proton density-weighted, diffusion-weighed, perfusion-weighted, and/or weighted by a preparation pulse.

4. The method as claimed in claim 1, wherein the trained assigning function is configured to use magnetic resonance data of only a subregion of the recording region as the input data.

5. The method as claimed in claim 1, wherein:

the magnetic resonance image dataset comprises a plurality of slice images, the trained assigning function being configured to use only a part of the slice images; and/or the magnetic resonance data of the input data is used spatially coarsened.

6. The method as claimed in claim 1, wherein the contrast assigning information item comprises a classification information item for the magnetic resonance image dataset that indicates a membership to one of a plurality of contrasts.

7. The method as claimed in claim 6, further comprising:
providing a database with a plurality of magnetic resonance image datasets to be evaluated is provided for classification with respect to at least one predetermined contrast of the plurality of contrasts, wherein all of the plurality of magnetic resonance image datasets are evaluated by applying the trained assigning function; and selecting the plurality of magnetic resonance image datasets classified as those pointing to the predetermined contrast according to the output data for training an evaluating function.

8. The method as claimed in claim 6, wherein the trained assigning function is trained with training data including magnetic resonance image datasets and an additional information item indicating a membership to one of the at least one contrasts.

9. The method as claimed in claim 1, further comprising establishing input data for a single use of the trained assigning function based on magnetic resonance image datasets assigned to at least two different contrasts, the contrast assigning information item being a classification information item for each magnetic resonance image dataset indicating a membership to one of a plurality of contrasts.

10. The method as claimed in claim 9, wherein the trained assigning function is trained with training data including groups of magnetic resonance image datasets and an additional information item indicating a membership of all the magnetic resonance image datasets of a group to one contrast.

11. The method as claimed in claim 9, further comprising grouping magnetic resonance data of the magnetic resonance image datasets showing a same anatomy together to form a multi-channel input dataset of the input data, wherein the classification information item is a vector assigning the magnetic resonance image datasets, sorted according to their channels, to a contrast.

12. The method as claimed in claim 11, wherein the channels are red-green-blue (RGB) channels.

13. The method as claimed in claim 11, wherein, when a number of channels is greater than a number of magnetic resonance image datasets, at least one of the channels not used for a magnetic resonance image dataset is used for a linear combination dataset formed using a linear combination from the magnetic resonance image datasets.

14. The method as claimed in claim 1, further comprising controlling a magnetic resonance (MR) scanner to: record the magnetic resonance data from the recording region of the patient, generate the input data, and provide the input data to the assigning facility.

15. A computer program product, embodied on a non-transitory computer readable medium, which includes a computer program that can be loadable into a memory of a magnetic resonance apparatus, that when executed by a processor of the magnetic resonance apparatus, causes the processor to perform the method of claim 1.

16. A non-transitory computer-readable storage medium with an executable program stored thereon, that when executed, instructs a processor to perform the method of claim 1.

17. An assigning facility, comprising:
a first interface configured to receive input data including magnetic resonance data of a magnetic resonance image dataset of a recording region of a patient; and processing circuitry that is configured to:
apply at least one trained assigning function to the input data to assign at least one contrast to the magnetic resonance image dataset;

determine output data including a contrast assigning information item based on the at least one contrast assigned to the magnetic resonance image dataset, the contrast assigning information item defining which contrast is present in the magnetic resonance image dataset and includes a probability of a presence of at least one contrast, an assignment to a contrast taking place based on a comparison of the probability with a threshold value and/or with at least one other probability of the contrast assignment information item, the at least one contrast existing due to a use of a contrast-specific magnetic resonance sequence during recording of the magnetic resonance data, wherein:

the trained assigning function is applied to a plurality of magnetic resonance image datasets and probabilities for a plurality of contrasts, a number of which corresponds at least to a number of the plurality of magnetic resonance image datasets, are established for each magnetic resonance image dataset, to assign the contrasts in succession for all the magnetic resonance image datasets, a contrast mapped therein is established as a maximum of the probabilities for this magnetic resonance image dataset, and probabilities for contrasts already assigned to a magnetic resonance image dataset are not considered; and generate an output data file based on the output data and provide the output data file, via a second interface, as an output of the assigning facility.

18. A magnetic resonance (MR) system, comprising:
a MR scanner configured to record magnetic resonance data from a recording region of a patient, generate the input data; and the assigning facility as claimed in claim 17.

19. A computer-implemented method for assigning at least one contrast to at least one magnetic resonance image dataset of a recording region of a patient, wherein the at least one contrast exists due to use of a contrast-specific magnetic resonance sequence during the recording, the method comprising:

receiving, by an assigning facility, input data including magnetic resonance data of the magnetic resonance image dataset;

applying, by the assigning facility, at least one trained assigning function to the input data to generate output data including a contrast assigning information item, wherein the contrast assigning information item defines which contrast is present in the magnetic resonance image dataset;

establishing input data for a single use of the trained assigning function based on magnetic resonance image datasets assigned to at least two different contrasts, the contrast assigning information item being a classification information item for each magnetic resonance image dataset indicating a membership to one of a plurality of contrasts; and generating, by the assigning facility, an output data file including the output data and making the output data file available in electronic form, wherein:

the method further comprises grouping magnetic resonance data of the magnetic resonance image datasets showing a same anatomy together to form a multi-channel input dataset of the input data, wherein the classification information item is a vector assigning the magnetic resonance image datasets, sorted according to their channels, to a contrast; or the trained assigning function is trained with training data including groups of magnetic resonance image datasets and an additional information item indicating a membership of all the magnetic resonance image datasets of a group to one contrast.

* * * * *